United States Patent
Darby et al.

(10) Patent No.: US 7,530,866 B2
(45) Date of Patent: May 12, 2009

(54) AMPHIBIOUS VEHICLE

(75) Inventors: Christopher Paul Darby, Coventry (GB); Mathew Roger Pease, Carmarthenshire (GB)

(73) Assignee: Gibbs Technologies Limited (VG)

( * ) Notice: Subject to any disclaimer, the term of this patent is extended or adjusted under 35 U.S.C. 154(b) by 150 days.

(21) Appl. No.: 10/522,372

(22) PCT Filed: May 6, 2004

(86) PCT No.: PCT/GB2004/001941

§ 371 (c)(1), (2), (4) Date: Jan. 18, 2005

(87) PCT Pub. No.: WO2004/103741

PCT Pub. Date: Dec. 2, 2004

(65) Prior Publication Data

US 2005/0239351 A1   Oct. 27, 2005

(30) Foreign Application Priority Data

May 19, 2003   (GB)   .................................... 0311439

(51) Int. Cl.
*B60F 3/00* (2006.01)
*B63B 1/22* (2006.01)
*B63B 39/06* (2006.01)

(52) U.S. Cl. ................ 440/12.5; 440/12.51; 440/12.66; 114/285; 114/286

(58) Field of Classification Search ....... 440/12.5–12.7; 114/67 A, 274–278, 280–282, 284–287
See application file for complete search history.

(56) References Cited

U.S. PATENT DOCUMENTS

| 3,141,436 | A | * | 7/1964 | Cathers et al. | .............. | 180/120 |
| 3,903,831 | A | | 9/1975 | Barlett et al. | | |
| 4,843,991 | A | * | 7/1989 | Morash | .................... | 114/67 A |
| 5,474,013 | A | * | 12/1995 | Wittmaier | .................... | 114/286 |
| 5,755,173 | A | | 5/1998 | Costa et al. | | |
| 5,765,497 | A | * | 6/1998 | Thomas et al. | ............. | 440/12.5 |
| 6,290,174 | B1 | * | 9/2001 | Gioia | .......................... | 244/105 |
| 2002/0022415 | A1 | * | 2/2002 | Choi et al. | .................. | 440/12.5 |

FOREIGN PATENT DOCUMENTS

| DE | 19611539 A1 | * | 7/1997 |
| EP | 0970825 | | 1/2000 |
| GB | 0449860 | * | 7/1936 |
| GB | 1385247 A | * | 2/1975 |
| WO | WO 02/45978 | | 6/2002 |

* cited by examiner

*Primary Examiner*—Ajay Vasudeva
(74) *Attorney, Agent, or Firm*—Young Basile

(57) ABSTRACT

A planing amphibious vehicle has at least one trim tab at its stern. A vehicle control system includes a mode change controller and a trim tab controller. The mode change controller informs the trim tab controller when a mode change event is taking place. The trim tab controller retracts the trim tabs if the mode change is from marine to land mode; and deploys the tabs if the change is from land mode to marine mode, to assist the vehicle in rising on to the plane. The controller may also retract the tabs if the vehicle reverses; and deploy the tabs if a change is made from reverse to forward motion. The vehicle control system may connect to actuators and sensors for retractable road wheels, which may use hydropneumatic struts. Safeguards against system faults and/or erroneous switch operation are included. Road wheel drive decouples are used; a marine drive decoupler may also be fitted.

9 Claims, 6 Drawing Sheets

AMPHIBIOUS VEHICLE

BACKGROUND OF THE INVENTION

The present invention relates to an amphibious vehicle.

Amphibious vehicles are inherently required to carry both road vehicle and marine vessel dedicated equipment. Hence, amphibious vehicles are generally heavier than boats of a similar size and power. This is particularly true in the case of planing amphibians, which require a relatively heavy wheel streamlining mechanism, such as retractable suspension or the like. In the case of an amphibious vehicle with open wheel arches, the drag exerted by the arches can be considerable and hence the overall hull drag is greater than for a conventional boat. This additional weight and drag make it difficult for the vehicle to rise onto the plane without initial deployment of trim tabs.

Trim tabs are well known for marine vessels, and in particular planing boats, as means for controlling the trim and attitude of the vessel to compensate for changes in load, speed or sea conditions. Commonly these devices are in the form of flat tabs or planes, which are pivotably connected along a generally horizontal axis to the hull of the vessel below the waterline near the stern. The angle of orientation of the trim tabs is adjustable and hence determines the fore and aft attitude of the vessel, when it is being propelled through the water. For example, if the rear of the vessel is heavily loaded the bow will typically rise out of the water and lead to inefficient forward motion. In these circumstances the angle of the trim tabs relative to the hull can be increased to lower the bow, lift the stern, and hence get the boat back onto a plane.

The position of the trim tabs on a conventional boat, when docked, is not of great importance since it is unlikely that the tabs will come into contact with, and be damaged by a submerged obstacle. Nevertheless, since trim tabs are typically extended by means of hydraulic actuators it is generally desirable for trim tabs to be retracted, when the boat is not in use, to avoid unnecessary marine growth on the actuators. Retraction also minimises the risk of damage when a boat is lifted from the water, for example, to go into dry storage. In accordance with this U.S. Pat. No. 5,113,780 discloses a trim tab control system, which includes a facility for automatically retracting the trim tabs when the engine ignition is switched off.

The system described in U.S. Pat. No. 5,113,780 is designed specifically for marine only vessels and is of limited benefit in the case of amphibious vehicles fitted with trim tabs. The greatest risk of damage, in the case of amphibious vehicles, occurs during and after the transition from marine to terrestrial mode, whilst the engine is still switched on. If the tabs remain in an operational position when the vehicle leaves the water, there is a significant risk that they may strike the ground at speed. Similarly, reversing into an obstacle with the trim tabs deployed could damage the tabs, the actuators and the body of the vehicle. The risk of inadvertently leaving the trim tabs deployed is enhanced because during the marine to terrestrial transition period the operator has several other important control tasks to consider.

Furthermore, the requirement in U.S. Pat. No. 5,113,780 that the tabs be retracted after the ignition is switched off necessitates an ignition independent power supply for powering the retraction system. Such a supply, however, is undesirable because the power source remains permanently connected to the circuit that it powers. Hence, even a relatively small current drain from the retraction circuit could lead to a significant reduction in the life of the source. Whilst a permanent current drain may be unlikely to arise as a result of poor design there is a significant probability that it could occur as a result of malfunction. The risk of this is particularly high in marine vessels where the presence of water makes short circuits more likely. It will also be appreciated that short circuits of this type also constitute a safety hazard.

This latter problem has been tackled in U.S. Pat. No. 5,474,013, which describes a system for automatically retracting trim tabs on a boat independently of the operation of the ignition switch. In the system described, a capacitor is charged from the vessels battery and the charge stored can be discharged to fully retract the trim tabs. However, this system is also designed specifically for marine only vessels and again is of limited benefit in the case of amphibious vehicles, for the reasons discussed above in relation to U.S. Pat. No. 5,113,780.

There is, therefore, a need for an amphibious vehicle, which includes a trim tab deployment system to allow it to rise onto the plane. There is also a need for the trim tab system for the amphibious vehicle to overcome or at least to mitigate the problems referred to above.

SUMMARY OF THE INVENTION

According to one aspect of the present invention there is provided an amphibious vehicle adapted for use on land and on water including a vehicle body, and at least one trim tab, for adjusting the trim of the amphibious vehicle when it is in a marine mode, connected to the vehicle body and movable relative to the vehicle body between a retracted position and any one of a range of operational positions, and a control system for controlling the position of the or each trim tab including detecting means for detecting at least one mode change event and tab actuation means for moving the or each trim tab relative to the vehicle body, the control system being adapted to automatically move the or each trim tab either into the retracted position or into any one of a range of operational positions according to the mode change event detected.

Preferably, the mode change event, detectable by the detecting means, is a first mode change event indicative of an onset of transition into a marine mode from a terrestrial mode and the control system is adapted to automatically move the or each trim tab into one of a: range of operational positions on detection of said first mode change event.

Preferably the or a further mode change event, detectable by the detecting means, is a second mode change event indicative of an onset of a transition into the terrestrial mode from a marine mode and the control system is adapted to automatically move the or each trim tab into the retracted position on detection of said second mode change event.

Preferably the detecting means are also capable of detecting selection of reverse propulsion in a marine mode, and the control system is adapted to automatically move the or each trim tab into the retracted position on detection of the selection of reverse propulsion.

Preferably the detecting means are also capable of detecting a selection of forward propulsion when the vehicle is moving in the reverse direction in a marine mode and the control system is adapted to automatically move the or each trim tab into any one of a range of operational positions on the selection of forward propulsion.

Preferably the control system includes means for signalling an operator on detection of at least one event.

Preferably the vehicle has a set of wheels for supporting the vehicle when it is in terrestrial mode, and the control system further includes means for retracting the set of wheels on detection of a transition into marine mode and means for deploying the set of wheels on detection of a transition into terrestrial mode.

Preferably the vehicle has a jet drive for propelling the vehicle when it is in marine mode and a reversing bucket, and the control system includes means for deploying the reversing bucket on detection of selection of reverse propulsion. Alternatively, where a reversing bucket is not fitted, the jet drive may be driven in reverse through the vehicle transmission.

According to another aspect of the present invention there is provided a method for controlling a trim tab system for an amphibious vehicle including the steps of automatically detecting a mode change event, and on detection of the mode change event automatically moving the or each trim tab either into the retracted position or into any one of a range of operational positions according to the event detected.

Preferably the mode change event detected is an onset of transition into a terrestrial mode.

Preferably the mode change event detected is an onset of transition into a marine mode.

BRIEF DESCRIPTION OF THE DRAWING

An embodiment of the invention will now be described, by way of example only, with reference to the following drawings in which.

DETAILED DESCRIPTION OF THE PREFERRED EMBODIMENT

Figure 1:
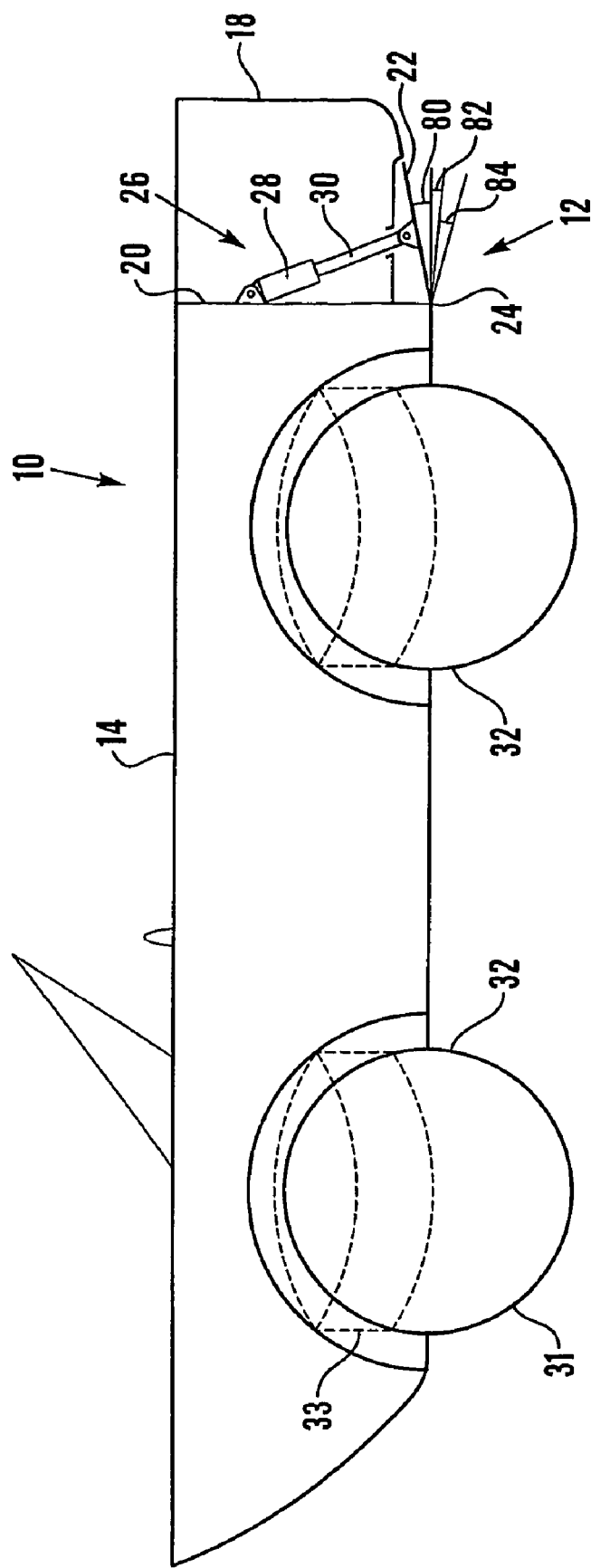
FIG. 1 shows diagrammatically a simplified side view, partially cut away, of an amphibious vehicle according to the invention.
Figure 2:
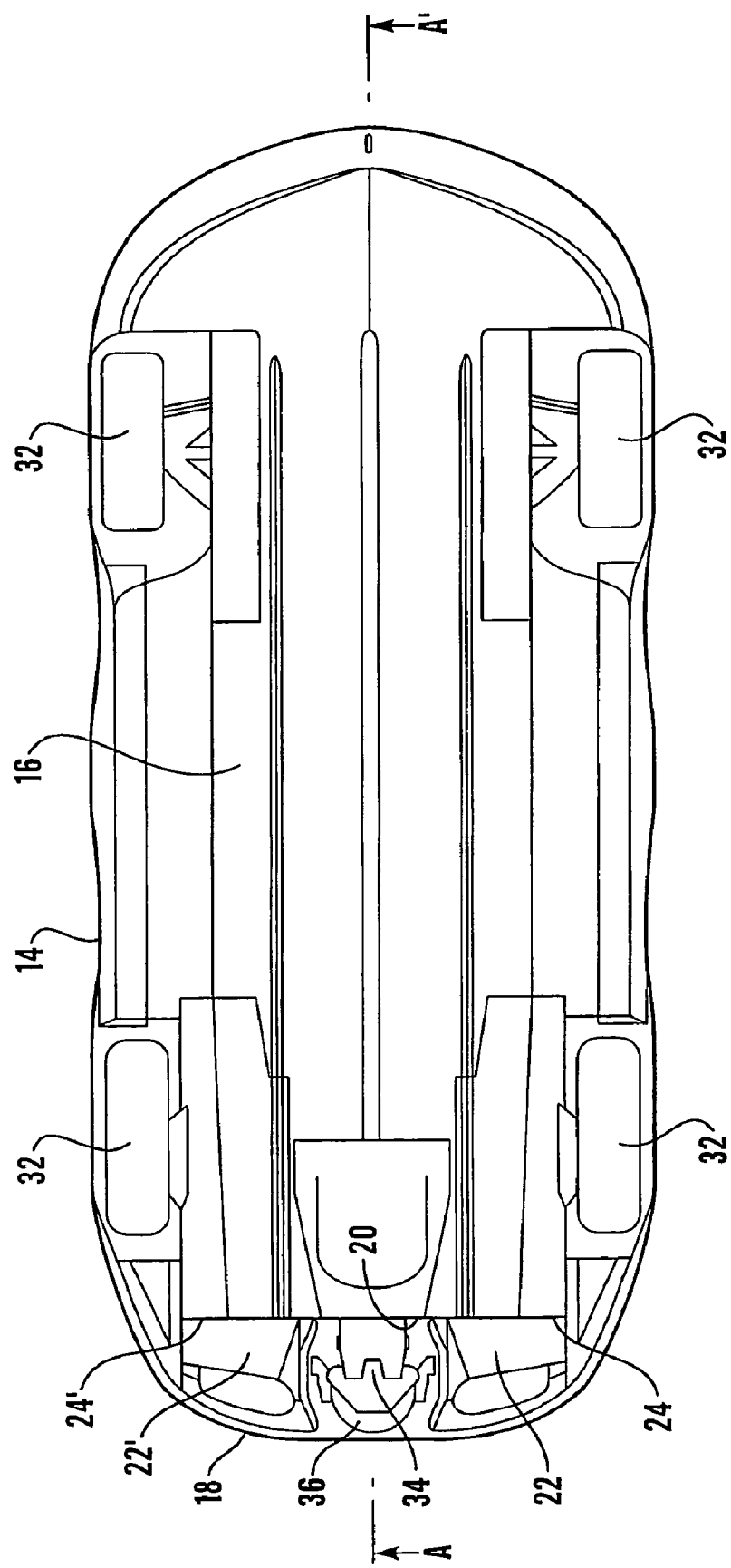
FIG. 2 shows diagrammatically a simplified plan view, from beneath, of the amphibious vehicle of FIG. 1.

In FIGS. 1 and 2 an amphibious vehicle is designated generally 10 and a trim tab system is designated generally 12. The amphibious vehicle 10 is capable of operation in both a terrestrial mode, for travel on land, and a marine mode, for travel on water, The vehicle 10 includes a vehicle body 14 having a hull section 16 and an outer body section 18. The hull section 16 is equivalent to the hull of a conventional boat and includes a transom 20 at the stern.

The trim tab system 12 includes two tabs 22 and two hydraulic actuators 26, provided one on either side of a central longitudinal axis AA' of the vehicle 10 as seen in FIG. 2. Whilst the figures show hydraulic actuators, any suitable actuation means may be used, for example electrically powered actuators. Each of the tabs 22 is connected to the base of the transom 20 by a corresponding hinge 24 along a generally horizontal axis to allow independent rotational movement of each tab relative to the transom 20, as seen on FIG. 1.

The hydraulic actuators 26 are of conventional construction, each actuator 26 having a cylinder 28 into which one end of an actuator rod 30 is slidably received. The cylinder 28, of each hydraulic actuator 26, is mounted pivotally on the transom 20 above a corresponding tab 22 to which the protruding end of the actuator rod 30 is pivotally connected. Hence, in operation, extension and retraction of the actuator rod 30 lowers and raises the corresponding tab 22 respectively.

Figure 3:
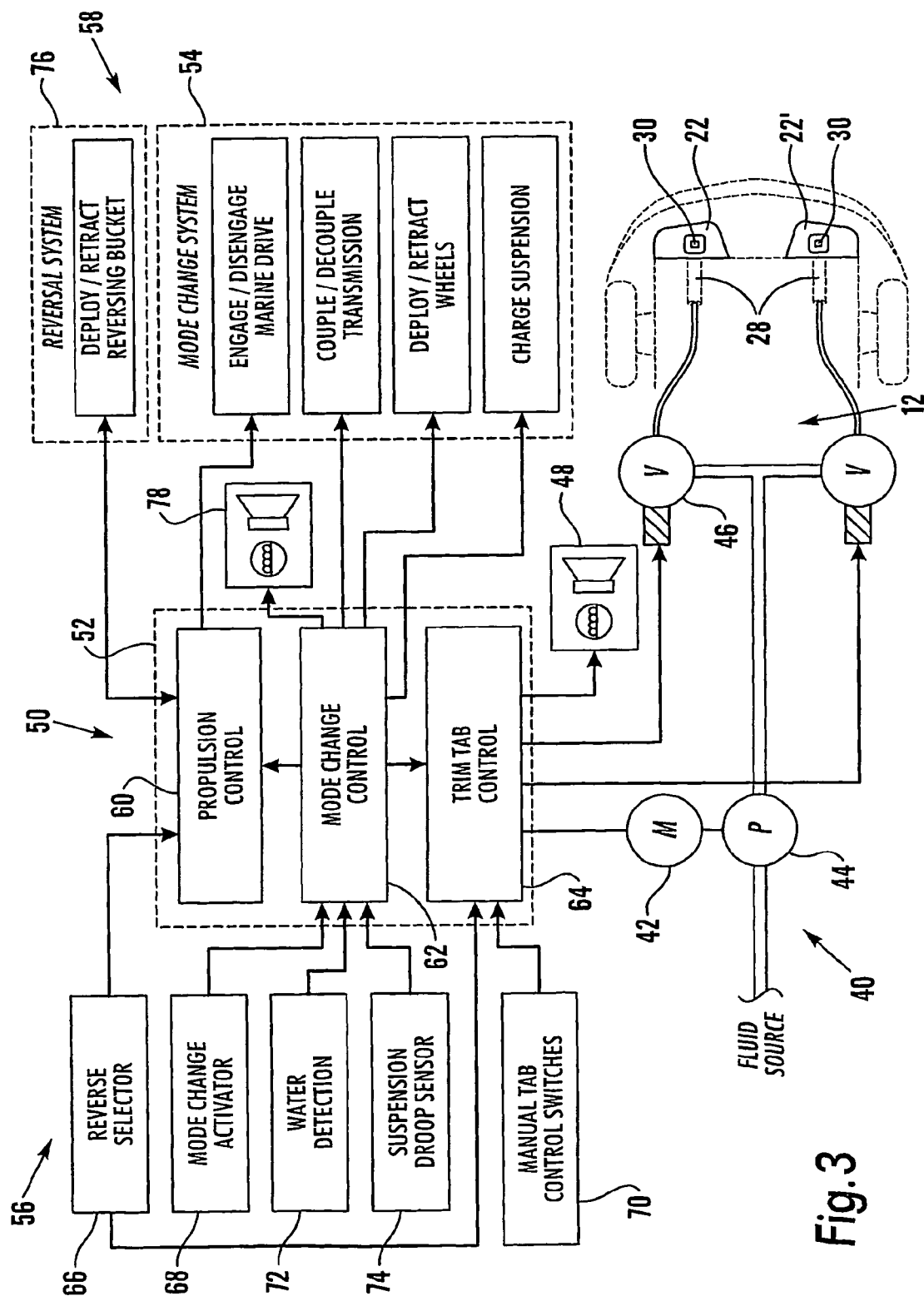
FIG. 3 is a functional block diagram of part of an integrated control network for the amphibious vehicle of FIG. 1.

The amphibious vehicle 10 has the standard features associated with a road vehicle including transmission, suspension and a set of wheels 32. The wheels 32 are provided with a retraction mechanism, which can be used to retract the wheels 32 from a protracted position 31 during a transition into marine mode. Similarly, the retraction mechanism can be used to protract the wheels 32 from a retracted position 33 during a transition into terrestrial mode. As shown in FIG. 3, the retraction mechanism makes up part of a mode change system 54 for converting the amphibious vehicle 10 from marine mode to terrestrial mode and vice versa.

The retraction mechanism may comprise any suitable means for retracting and protracting the wheels 32. Preferably, however, the retraction mechanism is of the form described in European Patent No. 0742761. The retraction mechanism, as such, does not form part of the present invention and so will not be described here in detail. However, if the reader requires details of the operation and construction of a suitable retraction system then they should refer to EP 0742761, the contents of which are hereby incorporated by reference.

The suspension may be a conventional hydro-pneumatic system with suspension cylinders part filled with hydraulic fluid and part filled with pneumatic gas. Prior to road use, the suspension cylinders of the amphibious vehicle require charging to bring the vehicle to the correct road height. Typically, the charging will occur either when the vehicle engine is switched on in terrestrial mode or when the vehicle makes a transition from marine into terrestrial mode. It should be understood, however, that the vehicle may have any suitable suspension system.

Additionally, the amphibious vehicle 10 includes a marine drive 34 for providing propulsion when the vehicle 10 is in the marine mode. The marine drive 34 is a conventional jet drive, which in operation issues a jet of high pressure water to propel the vehicle 10 forward. The jet drive may be fitted with a reversing bucket 36, which in use, may be deployed to divert the direction of the water jet to propel the vehicle 10 in reverse. Alternatively, where a reversing bucket is not fitted, the direction of rotation of the jet drive may be reversed through the vehicle transmission. It will be appreciated that other forms of marine drive could be employed, with corresponding reversing mechanisms, such as a marine propeller for example.

The mode change system 54 also includes means for decoupling the road wheel transmission and optionally engaging the marine drive 34 during transition into marine mode and means for charging the suspension, coupling the road wheel transmission and optionally disengaging the marine drive 34 during transition into terrestrial mode.

Referring now to FIG. 3, the trim tab system 12 also includes an electro-hydraulic system 40 for independently extending and retracting the rods 30 and hence operating the tabs 22. The electro-hydraulic system 40 includes an electric motor 42, which in operation, drives a fluid pump 44 to move fluid under pressure, via flow control valves 46, either to or from the actuators 26, to extend or retract the actuator rods 30 respectively. The flow control valves 46 allow independent selection and control of the actuators 26. Alternatively, the system for independently extending and retracting the rods 30 could be purely electromechanical employing electric motors to operate mechanical actuators with no hydraulic parts.

In order to control the electro-hydraulic and electromechanical systems an integrated control network 50 is provided. The control network 50 has a main controller 52, a set of input subsystems 56, and a set of output subsystems 58. The main controller 52 comprises a set of control subsystems 60, 62, 64, which include a propulsion controller 60, a mode change controller 62 and a trim tab controller 64. The main controller 52 can be implemented using any suitable means such as a dedicated logic circuit or a pre-programmed microcontroller.

The input subsystems 56 include manually operated switches such as a reverse selector 66, a mode change switch 68 and manual trim tab control switches 70. The input subsystems 56 also include sensor means comprising suspension droop sensor apparatus 74, for determining if the water buoyantly supports the vehicle 10. The sensor system may comprise any suitable means for detecting when the vehicle 10 is in water and buoyantly supported by it. An amphibious vehicle incorporating suitable sensor means is described in the applicant's International patent application number PCT/GB2002/005359 that claims the benefit of priority from British application No. 0128338.1, the contents of which are hereby incorporated by reference. A water presence sensor 72 may also be provided, as a secondary sensor.

The output subsystems 58 include the mode change system 54, the trim tab system 12, a reversal system 76 and warning systems 48, 78.

In operation, the main controller 52 accepts external inputs from the input subsystems 56 and directs them to at least one of the control subsystems 60, 62, 64 for processing. The control subsystems 60, 62, 64, process the inputs and produce a corresponding set of outputs, which determine, and hence control, the behaviour of the output subsystems 58. The outputs from any control subsystem 60, 62, 64, can also form internal inputs to any other control subsystem 60, 62, 64.

As seen in FIG. 3 the trim tab controller 64 receives external inputs from the trim tab control switches 70 and the reverse selector 66, and an internal input from the mode change controller 62. The trim tab controller 64 produces a corresponding set of outputs for controlling the trim tab system. More specifically the trim tab controller 64 controls the motor 42, the pump 44, the flow control valves 46 and hence the relative positioning of the tabs 22. The trim tab controller 64 also controls a trim tab warning system 48 for alerting the vehicle operator, when appropriate, to the position of the trim tabs 22.

The reverse selector 66 also provides an external input to the propulsion controller 60, which in turn produces an output to the reversal system 76 for either deploying or retracting the reversing bucket 36; or alternatively to reverse the rotation direction of the vehicle transmission.

The mode change controller 62 receives external inputs from the mode change switch 68, the suspension droop sensor 74 and the water presence sensor 72. The mode change controller 62 processes these external inputs and produces outputs to the mode change system 54, a mode change warning system 78, the propulsion controller 60 and trim tab controller 64.

The mode change warning system 78 includes a visual warning device in the form of a warning light to alert the operator when the vehicle is undergoing a mode change and to inform the operator when the transition is complete. The mode change warning system 78 also includes an audible warning device in the form of a buzzer for warning people in the vicinity of the vehicle 10 when a mode change is imminent.

It will be appreciated that the some or all of the systems and subsystems making up the control network 50 maybe equipped with reset functions (not shown) for resetting the whole system or individual systems if required, for example, in the event of problems during mode changes.

Figure 4:
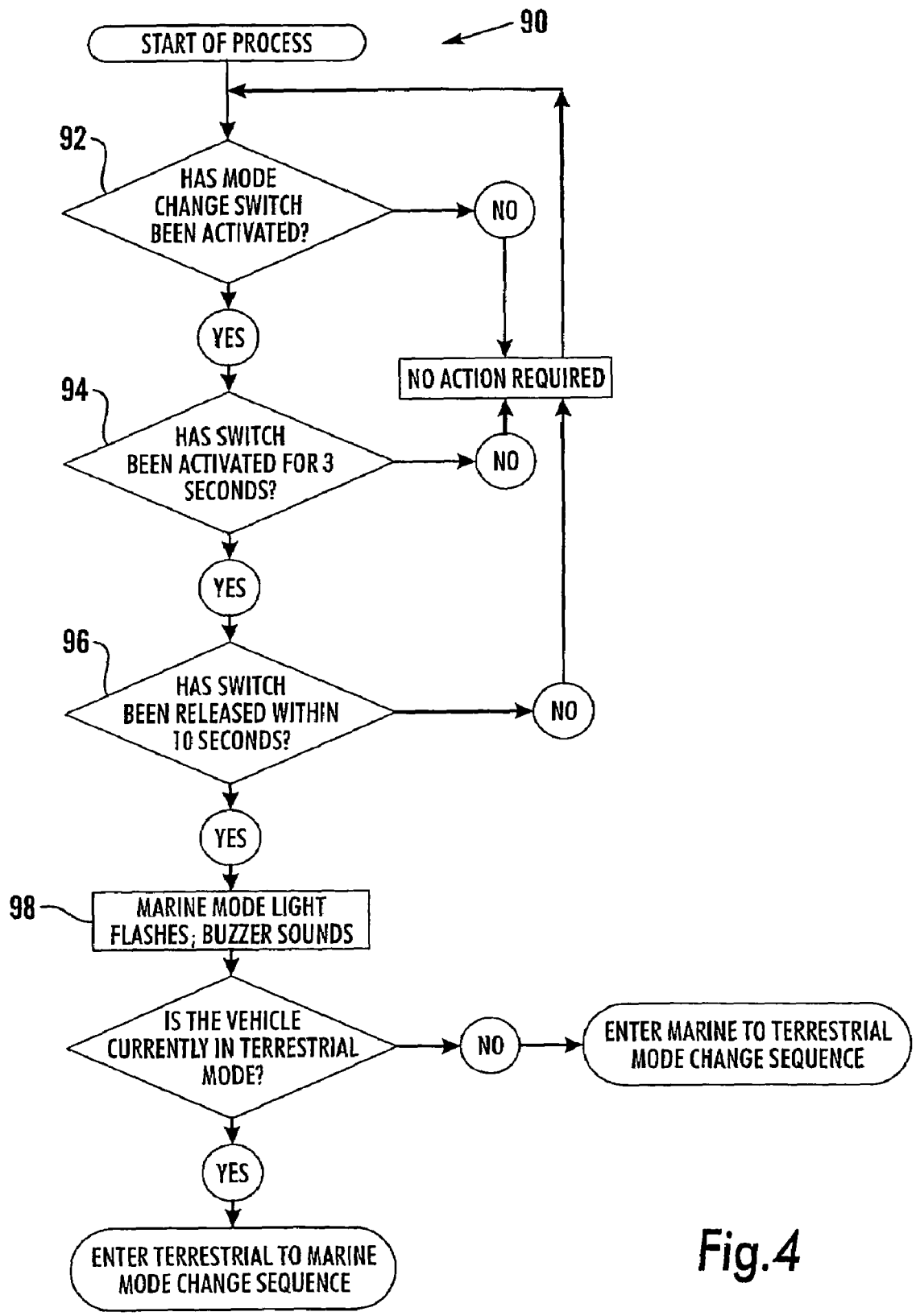
FIG. 4 shows a control system logic sequence to initiate a mode change.
Figure 5:
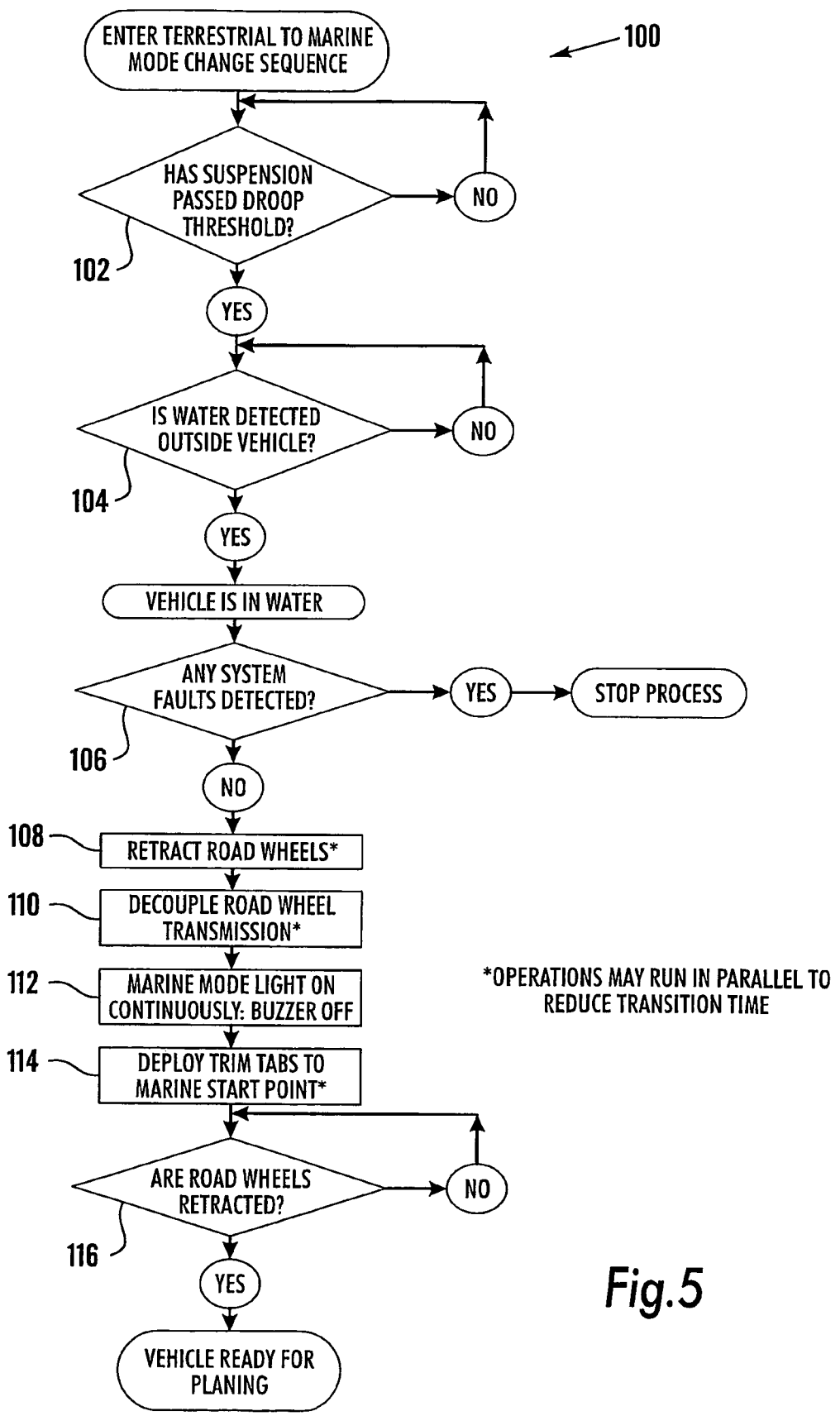
FIG. 5 shows a control system logic sequence for a mode change from terrestrial to marine mode, as initiated by the sequence shown in FIG. 4.
Figure 6:
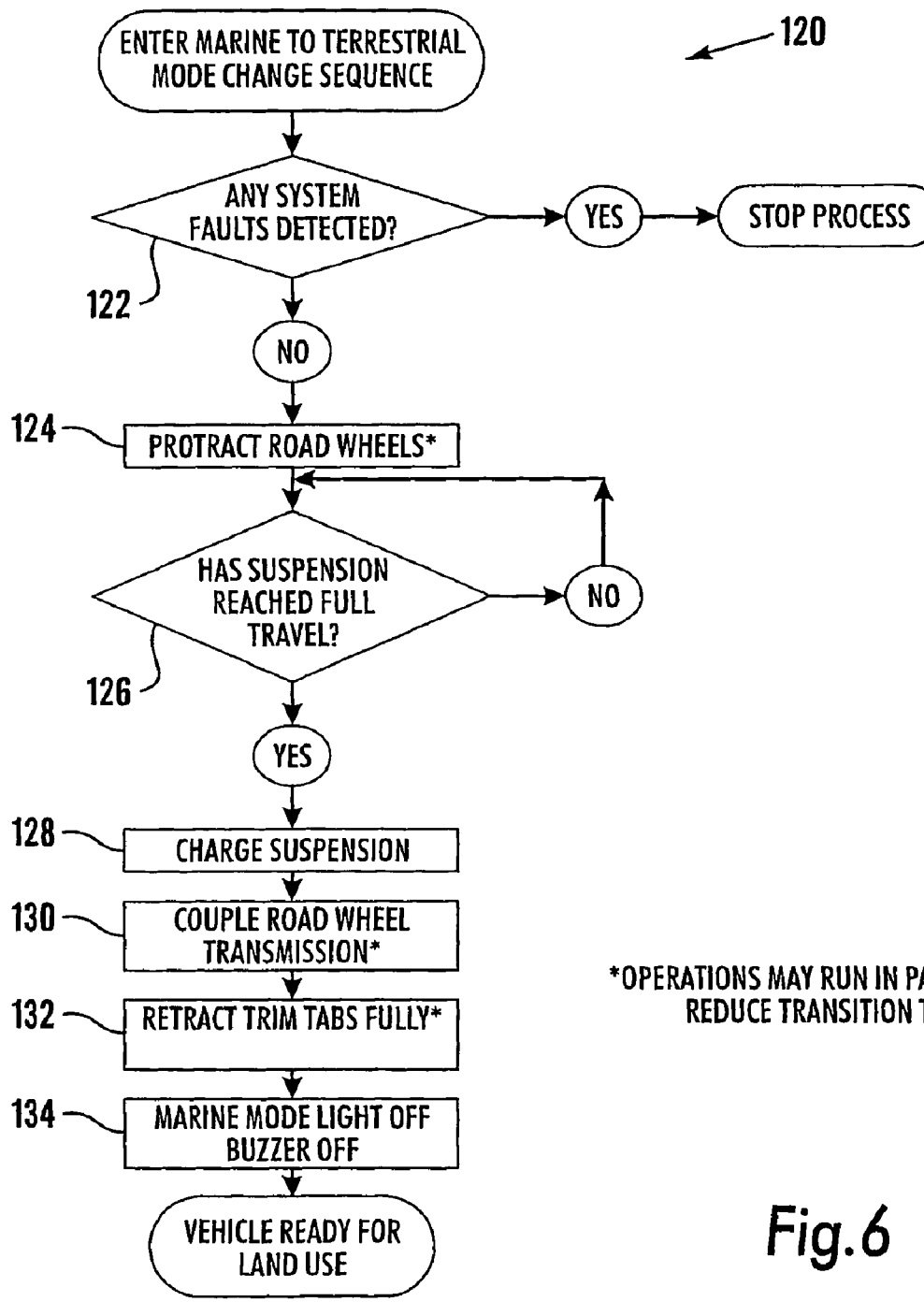
FIG. 6 shows a control system logic sequence for a mode change from marine to terrestrial mode, as initiated by the sequence shown in FIG. 4.

In operation, the control system 50 follows the logic sequences shown in FIGS. 4 and 5 to affect a transition from terrestrial into marine mode and the logic sequences shown in FIGS. 4 and 6 to affect a transition from marine into terrestrial mode. The logic sequences include several mode change events interspersed with decision points. Mode change events are events that are associated with transition either to terrestrial mode or to marine mode.

In FIG. 4 a control system logic sequence to initiate a mode change is designated generally 90. While the vehicle 10 is operational, the mode change controller 62 monitors the status of the mode change switch 68 to determine if it has been activated. On activation of the mode change switch 68, the logic sequence 90 initially establishes whether the switch has been activated in error. If the switch 68 is activated for less than three seconds then this is deemed to be indicative of accidental operation, for example by an operator pressing the wrong switch. Hence, no further action is taken and the mode change controller 62 reverts to its monitoring activity.

If the switch 68 is activated for more than three seconds then the mode change controller goes on to establish if the switch 68 is released within ten seconds. If the switch 68 remains activated after ten seconds then this is deemed to be indicative of malfunction or an enduring accidental operation, for example by an object being placed on or against the switch 68. Hence, no further action is taken and the mode change controller 62 reverts to its monitoring activity. An alert system could also be included which warns the operator that the switch 68 has either been erroneously operated or is malfunctioning.

Thus, if the duration of the switch activation is between three and ten seconds the mode change controller 62 signals the mode change warning system 78 to flash the visual warning device and sound the audible warning device, prior to determining the current status of the vehicle and initiating an appropriate mode change logic sequence.

In FIG. 5 a control system logic sequence for a mode change from terrestrial to marine mode is designated generally 100. On initiation, the mode change controller 62 monitors the external inputs from the sensor subsystem to determine if conditions are suitable for transition to occur. If the external input to the controller 62, from the suspension droop sensor apparatus 74 indicates that the vehicle 10 is not buoyantly supported, sufficient to allow safe retraction of the wheels 32, no action is taken and monitoring continues. However, if the suspension droop sensor apparatus 74 indicates that safe retraction of the wheels 32 is possible, the mode change controller 62 goes on to test for external water presence by monitoring the external input received from the water presence sensor 72. When external water presence is confirmed the vehicle 10 is deemed to be in water. If full droop and/or water presence are not detected within thirty seconds then conversion is stopped and the control system reverts to its general monitoring mode.

At this stage a system check is carried out and any faults detected result in termination of the process. If no faults are detected then the transition to marine mode can begin.

Transition to marine mode involves the mode change controller 62 initiating a number of mode change events 108, 110, 112, 114. In accordance with this, outputs are produced for controlling the mode change system 54, the mode change warning system 78, and for further processing by the trim tab controller 64 and the propulsion controller 60.

The mode change controller 62 signals the mode change system 54 to retract the wheels 32 and to decouple the road wheel transmission of the vehicle 10. Similarly, where a marine drive decoupler is fitted, the propulsion controller 60 receives an internal input from the mode change controller 62 and makes a subsequent output to the mode change system 54 to engage the marine drive 34. After this has occurred the mode change controller 62 signals the mode change warning system 78 to switch the visual warning device from flashing to continuous and the audible warning device to silent.

Additionally, on receipt of the internal input from the mode change controller 62 the trim tab controller 64 signals the trim tab system to automatically deploy the trim tabs from a retracted position 80 into a marine ready position 82. As seen on FIG. 1 the retracted position 80 lies at an angle substantially 13° above the horizontal and the marine ready position 82 lies substantially at an angle between 9° and 12° below the horizontal.

At this stage the mode change controller 62 interacts with the mode change system to establish when the wheels 32 are retracted. Once the wheels 32 are retracted the vehicle is ready for planing. However, fill engine power can be applied as soon as the road wheel drive is disengaged.

Whilst FIG. 5 shows the mode change events 108, 110, 112, 114 occurring sequentially it will be appreciated that there are other sequences that maybe followed and some or all of the events 108, 110, 112, 114 may run concurrently to speed up the transition.

In FIG. 6 a control system logic sequence for a mode change from marine to terrestrial mode is designated generally 120. Initially a system check is carried out and any faults detected result in termination of the process. If no faults are detected then the transition to terrestrial mode can begin.

As with the transition to marine mode, the transition to terrestrial mode involves the mode change controller 62 initiating a number of mode change events 124, 128, 130, 132, 134. In accordance with this, outputs are produced for controlling the mode change system 54, the mode change warning system 78, and for further processing by the trim tab controller 64 and the propulsion controller 60.

The mode change controller 62 signals the mode change system 54 to protract the wheels 32 and then suspends further commands until the suspension droop sensor 74 indicates that the suspension has reached full travel. The mode change controller 62 then signals the mode change system 54 to charge the suspension and couple the transmission ready for road use. Similarly, where a marine drive decoupler is fitted, the propulsion controller 60 receives an internal input from the mode change controller 62 and makes a subsequent output to the mode change system 54 to disengage the marine drive 34.

Additionally, on receipt of an internal input from the mode change controller 62 the trim tab controller 64 signals the trim tab system to automatically move the trim tabs to the retracted position 80 from any one of a range of operational positions. After retraction has occurred the mode change controller 62 signals the mode change warning system 78 to switch the visual warning device from flashing to off and the audible warning device to silent.

Whilst FIG. 6 shows the mode change events 124, 128, 130, 132, 134 occurring sequentially it will be appreciated that there are other sequences that may be followed and some or all of the events 124, 128, 130, 132, 134 may run concurrently to speed up the transition.

When the vehicle 10 is operating in the marine mode the operator can use the trim tab control switches 70 to manually adjust the position of the trim tabs 22 depending on external conditions, the forward speed of the vehicle 10, vehicle loading and any other requirements. In use, the trim tab control switches 70 provide an external input to the trim tab controller 64. The trim tab controller 64 processes this external input and makes a resulting output to the trim tab system 12 to either increase or decrease the angle of the tabs 22. For example, when the vehicle begins motion under forward propulsion the operator will typically increase the angle of the tabs from the marine ready position to an operational position. As the vehicle 10 accelerates and the bow begins to rise, the operator can further increase the angle of the tabs to correct fore and aft attitude. Similarly, if the vehicle 10 is unevenly loaded, such that it lists to one side, the tabs 22 maybe operated independently to correct the port/ starboard attitude of the vehicle 10 when it is in motion.

It will be appreciated that much of the manual tab control can be further automated to take account of standard conditions and loading. For example, the trim tab controller 64 could be provided with internal inputs from the propulsion controller 60 to automatically adjust the tabs depending on speed. Alternatively, a separate speed sensor could be used. A feedback mechanism involving a gyroscope, yaw rate sensor, or other attitude detector could also be included, which would allow automatic adjustment of the tabs depending on the attitude of the vehicle. Tab position feedback, to controller 64, would be required for fully automatic trim tab control.

When the vehicle 10 is operating in the marine mode, under forward propulsion, and reverse propulsion is then selected, the reverse selector 66 provides external inputs, corresponding to reverse selection, to the trim tab and propulsion controllers 64, 60. Consequently, the external inputs are processed by the appropriate control subsystem 60, 64 and appropriate outputs made to the related output subsystems 12, 76. Specifically, the trim tab controller 64 makes outputs to the trim tab system 12 to move the tabs 22 to the retracted position 80, and the propulsion controller 60 makes an output to the reversal system 76 to initiate the deployment of the reversing bucket 36.

Conversely, when the vehicle 10 is operating in the marine mode, under reverse propulsion, and forward propulsion is then selected, the reverse selector 66 provides external inputs, corresponding to forward selection, to the trim tab and propulsion controllers 64, 60. In this case, after processing the external input, the propulsion controller 60 initiates the retraction of the reversing bucket 36, where fitted, by the reversal system 76. Correspondingly, the trim tab controller 64 initiates the deployment of the tabs 22, to the marine ready position 82, by the trim tab system 12.

It will be appreciated that the control system 50 may also be configured to respond to other events, such as engine ignition being switched on or off. For example, when the vehicle 10 is in the marine mode with the engine off, and the ignition is then switched on, external inputs maybe provided to the trim tab controller 64 to move the tabs 22 to the marine ready position 82. Similarly, when the engine is switched off external inputs may be provided to the trim tab controller 64 to fully retract the tabs 22 or to move them to any other suitable default position.

Whereas the invention has been described in relation to what is presently considered to be the most practical and preferred embodiments, it is to be understood that the invention is not limited to the disclosed arrangements but rather is intended to cover various modifications and equivalent constructions included within the spirit and scope of the invention.

The invention claimed is:

1. An amphibious vehicle adapted for use on land and on water including:
   a vehicle body;
   at least one trim tab, for adjusting the trim of the amphibious vehicle when it is in a marine mode, the at least one trim tab connected to the vehicle body and movable relative to the vehicle body between a retracted position and any one of a range of operational positions; and
   a control system for controlling the position of the at least one trim tab,
   the control system including detecting means for detecting at least one mode change event and tab actuation means for moving the at least one trim tab relative to the vehicle body,
   the control system being adapted to automatically move the at least one trim tab either into the retracted position or into any one of a range of operational positions according to the mode change event detected,
   wherein the mode change event, detectable by the detecting means, is a first mode change event indicative of an onset of transition into a marine mode from a terrestrial mode and the control system is adapted to move the at least one tab into one of a range of operational positions on detection of the said first mode change event
   wherein the detecting means are capable of detecting selection of reverse propulsion in a marine mode, and the control system is adapted to automatically move the at least one trim tab into the retracted position on detection of the selection of reverse propulsion; and
   wherein the detecting means are capable of detecting a selection of forward propulsion when the vehicle is moving in the reverse direction in a marine mode, and the control system is adapted to automatically move the at least one trim tab into any one of a range of operational positions on the selection of forward propulsion.

2. An amphibious vehicle having a transom section, adapted for use on land and on water including:
   a vehicle body;
   at least one trim tab, for adjusting the trim of the amphibious vehicle when it is in a marine mode, the at least one trim tab connected to the vehicle body at a location proximate the transom section, wherein each trim tab is independently movable relative to the vehicle body between a retracted position and any one of a range of operational positions; and
   a control system for controlling the position of the at least one trim tab including detecting means for detecting at least one mode change event and tab actuation means for moving the at least one trim tab relative to the vehicle body, the control system being adapted to automatically move the at least one trim tab either into the retracted position or into any one of a range of operational positions according to the mode change event detected
   wherein the control system includes means for signaling an operator on detection of at least one event, wherein the mode change event, detectable by the detecting means, is a first mode change event indicative of an onset of transition into a marine mode from a terrestrial mode and the control system is adapted to move the at least one tab into one of a range of operational positions on detection of the said first mode change event.

3. An amphibious vehicle according to claim 2, in which one of the first mode change event and a further mode change event, detectable by the detecting means, is a second mode change event indicative of an onset of transition into the terrestrial mode from a marine mode and the control system is adapted to automatically move the at least one trim tab into the retracted position on detection of the said second mode change event.

4. A method for controlling the trim tab system of the amphibious vehicle according to claim 3 including the steps of automatically detecting the mode change event, and on detection of the mode change event automatically moving the at least one trim tab either into the retracted position or into said any one of the range of operational positions according to the event detected wherein the mode change event detected is an onset of transition into the terrestrial mode from the marine mode.

5. A method for controlling the trim tab system of the amphibious vehicle according to claim 2 including the steps of automatically detecting the mode change event, and on detection of the mode change event automatically moving the at least one trim tab either into the retracted position or into said any one of the range of operational positions according to the event detected wherein the mode change event detected is an onset of transition into the marine mode from the terrestrial mode.

6. An amphibious vehicle, adapted for use on land and on water including:
   a vehicle body;
   at least one trim tab, for adjusting the trim of the amphibious vehicle when it is in a marine mode, connected to the vehicle body and movable relative to the vehicle body between a retracted position and any one of a range of operational positions; and
   a control system for controlling the position of the at least one trim tab including detecting means for detecting at least one mode change event and tab actuation means for moving the at least one trim tab relative to the vehicle body, the control system being adapted to automatically move the at least one trim tab either into the retracted position or into any one of a range of operational positions according to the mode change event detected in which the vehicle has a set of wheels for supporting the vehicle when it is in terrestrial mode, and the control system includes means for retracting the set of wheels on detection of a transition into marine mode and means for deploying the set of wheels on detection of a transition into terrestrial mode.

7. An amphibious vehicle, adapted for use on land and on water including:
   a vehicle body;
   at least one trim tab, for adjusting the trim of the amphibious vehicle when it is in a marine mode, connected to the vehicle body and movable relative to the vehicle body between a retracted position and any one of a range of operational positions; and
   a control system for controlling the position of the at least one trim tab including detecting means for detecting at least one mode change event and tab actuation means for moving the at least one trim tab relative to the vehicle body, the control system being adapted to automatically move the at least one trim tab either into the retracted position or into any one of a range of operational positions according to the mode change event detected
   wherein the vehicle has a jet drive for propelling the vehicle when it is in marine mode and a reversing bucket, and the control system includes means for deploying the reversing bucket on detection of selection of reverse propulsion.

8. An amphibious vehicle adapted for use on land and on water including:

a vehicle body;
at least one trim tab, for adjusting the trim of the amphibious vehicle when it is in a marine mode, connected to the vehicle body and movable relative to the vehicle body between a retracted position and any one of a range of operational positions; and
a control system for controlling the position of the at least one trim tab including detecting means for detecting at least one mode change event and tab actuation means for moving the at least one trim tab relative to the vehicle body, the control system being adapted to automatically move the at least one trim tab either into the retracted position or into any one of a range of operational positions according to the mode change event detected;
wherein the mode change event, detectable by the detecting means, is a first mode change indicative of an onset of transition into a marine mode from a terrestrial mode and the control system is adapted to move the at least one tab into one of a range of operational positions on detection of the said first mode change event;
wherein the detecting means are capable of detecting selection of reverse propulsion in a marine mode, and the control system is adapted to automatically move the at least one trim tab into the retracted position on detection of the selection of reverse propulsion; and
wherein the detecting means are capable of detecting a selection of forward propulsion when the vehicle is moving in the reverse direction in a marine mode, and the control system is adapted to automatically move the at least one trim tab into any of the range of operational positions on the selection of forward propulsion.

9. An amphibious vehicle adapted for use on land and on water including;
a vehicle body;
at least one trim tab, for adjusting the trim of the amphibious vehicle when it is in a marine mode, connected to the vehicle body and movable relative to the vehicle body between a retracted position and any one of a range of operational positions; and
a control system for controlling the position of the at least one trim tab including detecting means for detecting at least one mode change event and tab actuation means for moving the at least one trim tab relative to the vehicle body, the control system being adapted to automatically move the at least one trim tab either into the retracted position or into any one of a range of operational positions according to the mode change event detected,
wherein the vehicle has a jet drive for propelling the vehicle when it is in marine mode and a reversing bucket, and the control system includes means for deploying the reversing bucket on detection of selection of reverse propulsion.

* * * * *